United States Patent
Meek et al.

[15] 3,656,284
[45] Apr. 18, 1972

[54] DISC MOWER CONDITIONER

[72] Inventors: Nigel W. Meek, Aylesbury; Robert S. Morris, Bicester, both of England

[73] Assignee: Sperry Rand Limited, Holborn Viaduct, London, England

[22] Filed: May 28, 1970

[21] Appl. No.: 41,338

[30] Foreign Application Priority Data

May 30, 1969    Great Britain......................27,657/69

[52] U.S. Cl. ..........................................56/14.5, 56/DIG. 1
[51] Int. Cl. .........................................................A01d 43/00
[58] Field of Search....................56/DIG. 1, 14.2, 14.5, 503, 56/192, 14.4

[56] References Cited

UNITED STATES PATENTS

| | | | |
|---|---|---|---|
| 2,648,943 | 8/1953 | Shafer et al. | 56/DIG. 1 |
| 2,634,569 | 4/1953 | Raney et al. | 56/14.3 |
| 3,488,929 | 1/1970 | Hale | 56/DIG. 1 |
| 3,118,264 | 1/1964 | Barnes | 56/DIG. 1 |
| 3,402,532 | 9/1968 | Johnston et al. | 56/DIG. 1 |

Primary Examiner—Antonio F. Guida
Attorney—Joseph A. Brown, John C. Thompson, James J. Kennedy and George C. Bower

[57] ABSTRACT

A combined crop mower and conditioner is disclosed which has a mower bar having at least two disc cutters and a pair of conditioning rolls behind and above the discs with the rotational axes horizontal. The discs and rolls are driven independently of the forward motion of the machine and are relatively positioned so that, in operation, cut crop is propelled by the cutter discs into the intake area of the conditioning rolls. For safety, the cutter bar and conditioning rolls are supported between end plates extending down to ground level, the axle of the machine obstructs the area below the rolls and behind the discs, and a hood, the rear portion of which is hinged to form a baffle plate, extends from above and in front of the discs to behind the rolls. This minimizes the danger from objects, such as stones, being thrown out by the discs.

11 Claims, 3 Drawing Figures

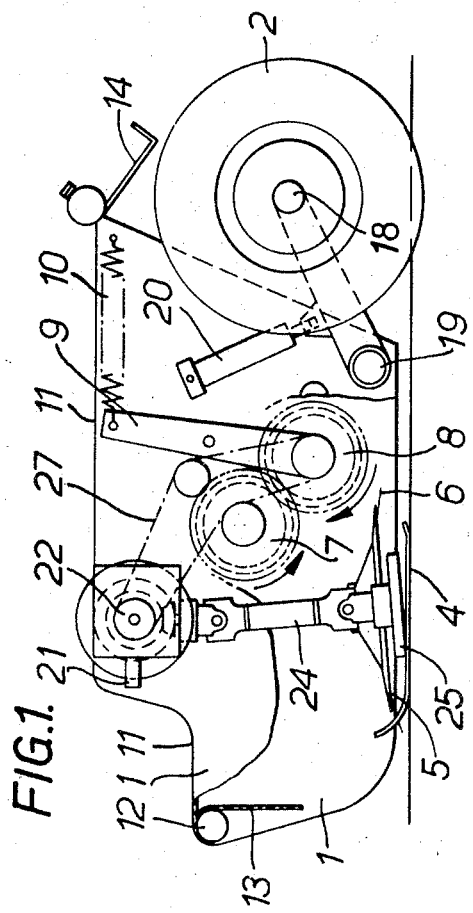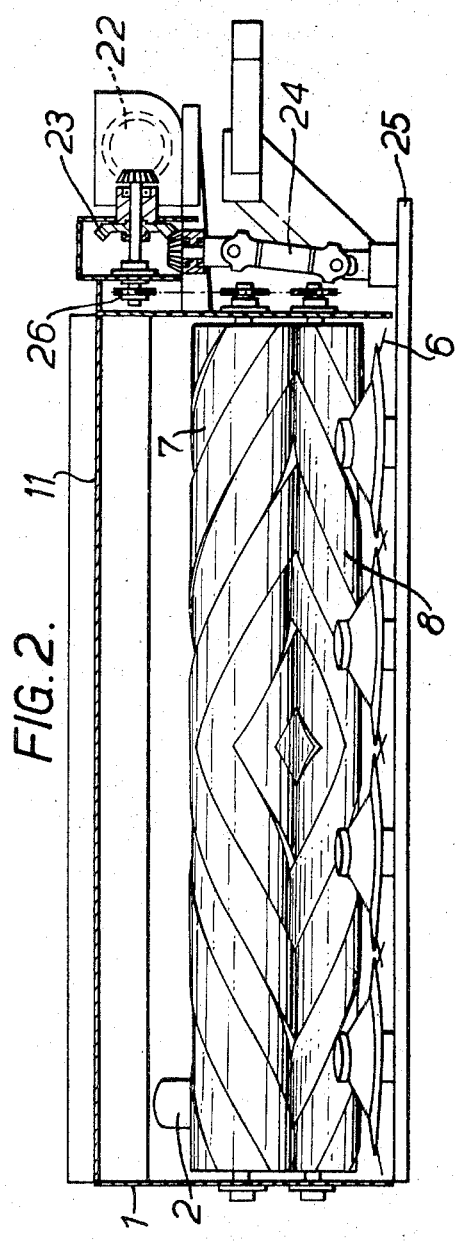

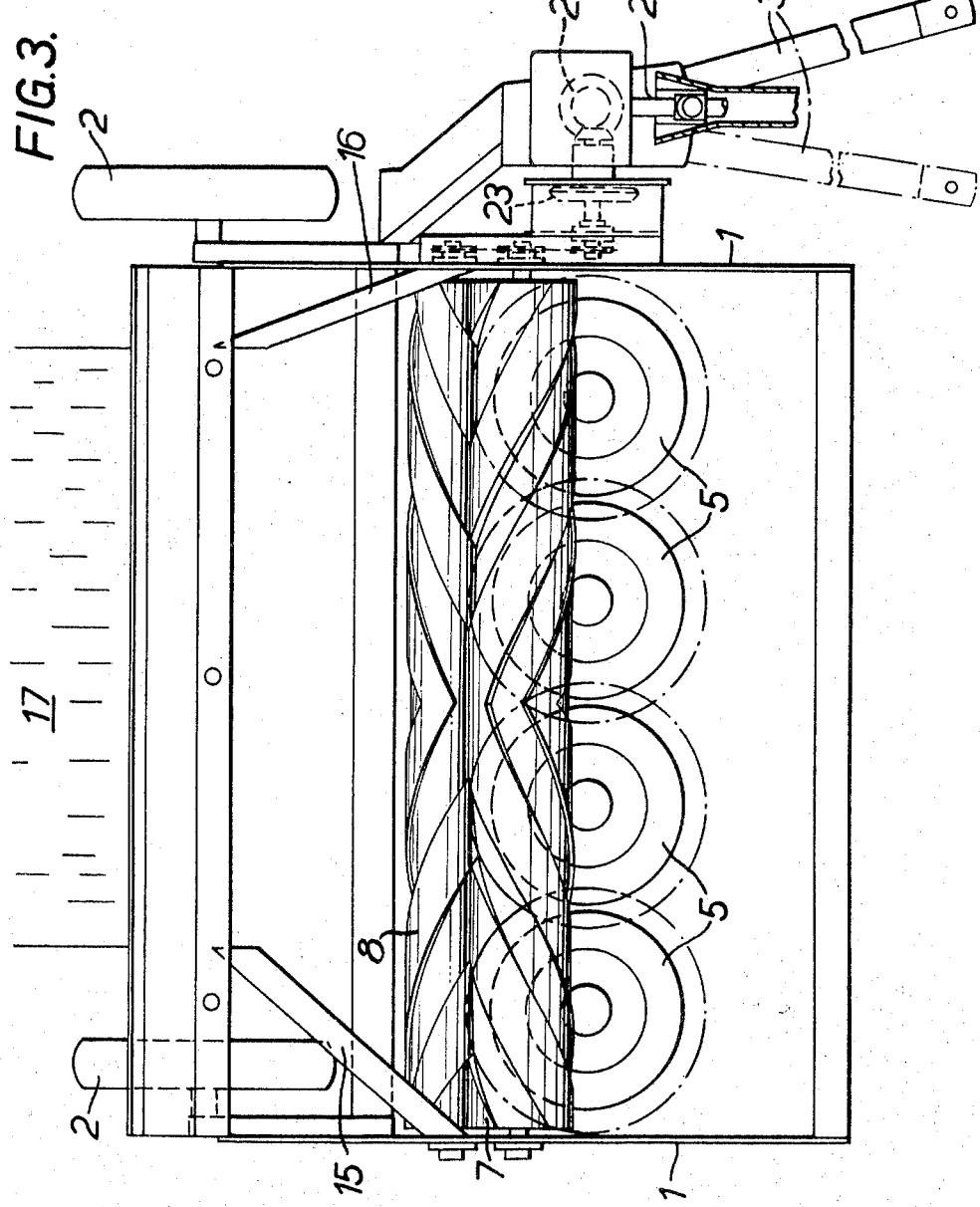

DISC MOWER CONDITIONER

The present invention relates to crop harvesting machinery, and, in particular, to mowing machines used for cutting grass and similar crops, for example for making hay or silage.

It has previously been proposed to mount a cutterbar mower and a conditioner comprising a pair of conditioning rolls for towing behind a tractor, but offset from one another, so that the cutter cuts a swath of the crop, and the conditioner crimps or crushes the adjoining swath which was cut on the previous circuit of the field.

In recent years a new machine has come into wide spread usage, this machine being known as a mower-conditioner. This machine which is illustrated in U. S. Pat. No. 3,375,643 issued Apr. 2, 1968 employs a conventional reciprocating cutter bar and a reel mounted over the cutter bar to move the cut material rearwardly and upwardly into the bite of a pair of conditioning rolls. This machine has gained widespread commercial acceptance. However, it is an object of this invention to provide a lower cost machine which will have substantially the same operating characteristics as the mower-conditioner referred to above.

The invention makes use of a disc cutter mechanism. When such a mechanism is driven forward into a crop, the rapid rotation of the cutter discs propels the cut crop backwards up over the discs with some force. By positioning conditioning rolls so that the cut crop is propelled by the cutter discs into their intake area, crop is cut and fed smoothly through the rolls without accumulating and jamming either the cutters or the conditioner, even if mowing is interrupted.

Therefore, according to one aspect of the present invention, a combined crop mower and conditioner comprises a mower bar having at least two disc cutters, and a pair of conditioning rolls, preferably of the intermeshing type illustrated in Canadian Pat. No. 776,904 issued Jan. 30, 1968, positioned behind and above the cutter discs with their axes of rotation horizontal, the cutter discs and conditioning rolls being arranged to be driven independently of the forward motion of the machine, and being relatively positioned so that in operation cut crop is propelled by the cutter discs into the intake area of the conditioning rolls.

The machine may be mounted directly on a tractor or may be arranged for towing, in which case, the power for driving the cutter discs and the conditioning rolls may be derived from the tractor power take-off. Alternatively, the machine may be self-propelled, in which case an independent power source may be provided for the cutter discs and the rolls. The discs may be driven either from above or below, and may be slanted downwards through a small angle so as to cut the crop as close as possible to the ground.

A further aspect of the invention is concerned with the safety of the machine as just described. When the cutting disc of a disc mower encounters a small movable object, for example, a stone, the object may be engaged by the disc, which normally rotates at a high speed, and may be propelled outward in any direction with very great force, causing injury or damage. There is also a risk of the disc, or the knives it carries, becoming shattered and a portion of these likewise being propelled outwards and causing injury or damage. In the present invention as just described the cutter bar mechanism and the axes of the conditioning rolls require to be supported between substantial end frames, which may be in the form of solid plates, and these shield the sides of the cutter discs. The rolls themselves close a large part of the area to the rear of the cutter discs, and the region just below them can be shielded by a bar or similar obstacle which may in practice be formed by the axle supporting the land wheels. A hood and baffle plates are in any case desirably provided for containing the crop and directing it backwards into a windrow behind the machine. The machine may thus conveniently be designed in such a way that in operation the cutter discs are shielded in all directions except immediately to the front in the crop to be mown, where persons and equipment liable to injury are unlikely to be standing.

According, therefore, to another aspect of the present invention, a crop mowing and conditioning machine of the kind just described has its cutter bar and conditioning rolls supported between end plates extending down to ground level, a bar, which may be the axle supporting the land wheels, is arranged to obstruct the area below the conditioning rolls and immediately behind the cutting discs, and a hood, the rear portion of which may be hinged to form a baffle plate, extends from above and in front of the cutter discs to behind the conditioning rolls.

One example of the invention will now be described with reference to the accompanying schematic drawings, in which FIG. 1 shows a longitudinal section through a mowing and conditioning machine according to the present invention, and FIGS. 2 and 3 show respectively a front elevation and a plan view with the hood removed, elements not essential to the invention being omitted.

Referring to the drawings, the machine is mounted for towing behind a tractor and comprises a pair of side frames 1, one of which appears in FIG. 1. The weight of the mower is carried partly on a pair of land wheels 2, partly by the tractor drawbar 3, and partly by a row of skids 4.

The cutter bar carries a row of four cutting discs 5 driven from below, each carrying three knives 6 at angles of 120°, each knife being free to swing through a complete circle. The cutter discs are geared together so that adjacent discs turn in opposite directions, and their knives pass the line of the cutter bar alternately without risk of collision. The plane of the cutter knives is inclined slightly downward towards the forward edge, for example through an angle of about 5°.

A pair of intermeshing rollers, 7 and 8, are mounted just above the cutter discs, and with the forward roller 7 slightly behind their axes of rotation. The bearings of the roller 7 are mounted directly in the side plates 1, and the roller 8 is mounted between a pair of pivoted arms, one of which, 9, appears in FIG. 1. Each of these arms is loaded by a tension spring 10 to maintain a constant pressure between the rollers. The surfaces of the rollers are of rubber having a double helical fluting directed towards the center, so that crop passing through the rollers tends to be turned inwards and away from the side plates and bearings.

The top of the mower is closed by a sheet metal hood 11, and a pusher bar 12 at the front edge pushes down the crop as the mower advances so as to expose its base to the cutting discs 5. A flap 13 of a flexible material, such as plastic or synthetic rubber, partly covers the mouth at the front of the mower.

At the rear of the mower an adjustable baffle plate 14 hinged at the rear of the hood 11 is arranged to deflect the crop downwards to form a swath behind the mower, working in conjunction with a pair of hinged side plates, 15 and 16, so as to form a suitable windrow 17 for drying.

The land wheels 2 are supported on a pair of stub axles 18 offset from a tubular axle 19 extending through the side plates 1 across the width of the machine. This tubular axle is rotatable, and a hydraulic jack 20 coupled to the hydraulic system of the tractor is arranged to rotate it so that the machine can be raised or lowered relative to the ground.

Power is supplied to the machine by an input shaft 21 arranged to be coupled to the power take-off of the tractor. This shaft drives the cutters through a first bevel gearbox 22, a second bevel gearbox 23, a vertical shaft 24 provided with universal joints at each end, and a gear train (not visible in the drawings) lying within the cutter bar 25. The cutter bar 25 is in a form of a trough containing lubricant and having within it spur gears coupled directly to the cutting discs 5, and two idlers being provided between each disc and the next so that adjacent discs rotate in opposite senses.

The shaft of the second bevel gearbox 23 extends beyond the gearbox and carries a sprocket 26 which drives the crimping rolls 7 and 8 by means of a chain 27.

In operation the crop is bent forward by a pusher bar 12 and cut by the knives 6. The rotation of the cutting discs 5 tends to propel the cut crop upwards to the intake of the rollers 7 and 8. After being conditioned by the rollers it is deflected downwards by the rear part of the hood 11 and baffle 14, to be left in a windrow 17 behind the machine.

It will be noted that the cutting discs 5 are shielded at the sides by the side plates 1, partly shielded at the front by the pusher bar 12 and flap 13, enclosed on top by the hood 11 and the baffle 14, and the gap below the crimping rollers is obstructed by the axle 15 of the land wheels, so that any stones or other objects picked up by the knives are obstructed by one or other of these parts, and prevented from causing damage or injury.

The rollers 7 and 8 draw up the crop and prevent it engaging the cutting discs 5 a second time. In an experimental model according to the above description used for cutting a grass crop it was found that the power required to drive the discs, was reduced for this reason by more than the amount required to drive the crimping rolls, so that there was an overall reduction in the power required for mowing.

Although the model described is arranged to be towed, it could readily be adapted for tractor mounting.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A ground traversing crop mowing and conditioning machine comprising: a mobile frame structure adapted to be propelled forwardly over the ground; an upper and lower pair of aggressive cooperating conditioning rolls, each rotatively mounted about a transverse-horizontal axis within said frame structure, said pair of rolls being disposed such that said upper roll is disposed forwardly of and in close proximity to said lower roll, defining an intake area along the forward sides of the proximate conditioning rolls; one or more pairs of counter rotating rotary cutting means spaced generally below and forwardly of said conditioning rolls and drive means for driving said rotary cutting means at a relatively high speed for cutting oncoming crop on impact and flinging the cut crop directly into the intake area of said conditioning rolls, said flinging action of said rotary cutting means providing a direct feed to the intake area of said conditioning rolls while acting to clear said rotary cutting means and move the cut crop therefrom to avoid bunching and clogging in the vicinity thereof; and means for driving said upper and lower conditioning rolls in counter directions for engaging the cut crop material flung into the intake area of said conditioning rolls and moving it generally rearwardly therefrom between said rolls where the crop material is deposited on the ground behind the forwardly moving mowing and conditioning machine.

2. A ground traversing crop mowing and conditioning machine, as recited in claim 1, wherein a baffle structure is provided adjacent the rear sides of said conditioning rolls for deflecting the crop being discharged therefrom towards the ground such that the crop is deposited thereon in a fluffy swath.

3. A ground traversing crop mowing and conditioning machine, as recited in claim 1, wherein said conditioning rolls include a series of alternately spaced ribs and grooves about the periphery thereof, said upper roll is positioned such that the forward periphery thereof is spaced forwardly of the forward periphery of the lower roll, said rolls are spaced in relative close proximity to each other such that the grooves and ribs assume an intermesh relationship, and wherein said lower roll is particularly spaced such that the lower periphery thereof is generally tangential to the plane of said rotary cutting means such that the lower portion of the crop being flung rearwardly is engaged by the lower periphery of the lower conditioning roll and carried upwardly therefrom by the aggressiveness thereof for conditioning by said rolls.

4. A ground traversing crop mowing and conditioning machine comprising: a mobile frame structure adapted to be propelled forwardly over the ground; one or more pairs of counter rotating rotary cutting means transversely disposed near the ground forwardly within said frame structure and drive means for driving said rotary cutting means at a relatively high speed for cutting oncoming crop on impact and propelling the mass of cut crop rearwardly therefrom; and a pair of upper and lower aggressive conditioning rolls disposed immediately behind said counter rotating cutting means and particularly spaced for intercepting the mass of rearwardly propelled cut crop, each of said conditioning rolls being rotatively mounted about a transverse-horizontal axis within said frame structure and said upper roll being disposed forwardly of said lower roll, and said lower roll disposed such that the lower periphery thereof lies generally tangential to the plane of said rotary cutting means, assuring that the lower portions of the mass of cut crop is intercepted by the lower conditioning roll; and means for driving said upper and lower conditioning rolls in counter directions for engaging the mass of cut crop propelled rearwardly towards said conditioning rolls and moving it generally rearwardly therefrom between said rolls where the crop material is deposited on the ground behind the forwardly moving mowing and conditioning machine.

5. A ground traversing crop mowing and conditioning machine as recited in claim 4 wherein a space is provided between the rear periphery of said rotary cutting means and the forward lower periphery of said lower conditioning roll for stones and other foreign debris to pass therethrough, thereby adverting the possibility of stones passing through and damaging the conditioning rolls while depositing the stones on the ground underneath the crop being discharged out the rear of said rolls.

6. A ground traversing crop mowing and conditioning machine, as recited in claim 4, wherein said rotary cutting means includes a series of cutting discs, each disc including a plurality of equally spaced cutting knives extending radially therefrom.

7. A ground traversing crop mowing and conditioning machine comprising: a mobile frame structure adapted to be propelled forwardly over the ground; one or more pairs of counter rotating rotary cutting means transversely disposed near the ground forwardly within said frame structure and drive means for driving said rotary cutting means at a relatively high speed for cutting oncoming crop on impact and propelling the mass of cut crop rearwardly therefrom; an upper and lower pair of transversely extending rotatively mounted cooperating conditioning rolls disposed generally behind said rotary cutting means within said frame structure and particularly spaced relative to said rotary cutting means for intercepting the mass of cut crop being propelled rearwardly therefrom, each of said conditioning rolls having alternately spaced ribs and grooves circumferentially disposed therearound, the particular spacing of said conditioning rolls for intercepting the rearward propelled crop includes the disposition of said lower rolls such that the lower periphery thereof lies in approximately tangential relationship to the plane of said rotary cutting means, and the disposition of said upper roll forwardly of said lower roll but in close proximity thereto such that the ribs and grooves of said rolls assume an intermesh relationship; means for driving said upper and lower conditioning rolls in counter directions for intercepting the rearwardly propelled crop and drawing it between said upper and lower conditioning rolls, discharging the cut crop about the rear sides of said conditioning rolls; and a baffle structure disposed generally behind said conditioning rolls for deflecting the rearward moving crop being discharged from the rear sides of the conditioning rolls onto the ground in a fluffy swath.

8. A ground traversing crop mowing and conditioning machine, as recited in claim 7, wherein said rotary cutting means comprises a series of disc rotatively mounted about slightly inclined axes such that the forward portions thereof are inclined downwardly toward the ground.

9. A ground traversing crop mowing and conditioning machine, as recited in claim 8, wherein said means for driving said rotary cutting disc includes a drive line transversely disposed beneath said cutting disc and having means extending upwardly therefrom and connected underneath to each disc for driving the individual disc.

10. A ground traversing crop mowing and conditioning machine comprising: a mobile frame structure adapted to be propelled forward over the ground and including a pair of longitudinally extending side members; a transversely extending rock shaft journalled between said side members; a pair of laterally spaced rocker arms fixed to said rock shaft and extending therefrom; a pair of wheels each rotatively mounted to one of said rocker arms; a remotely controlled hydraulic cylinder interconnected between said frame structure and at least one rocker arm for varying the height of said frame structure relative to the ground; one or more pairs of counter rotating rotary cutting discs transversely disposed near the ground forwardly within said frame structure and drive means for driving said rotary cutting discs at a relatively high speed for cutting oncoming crop on impact and propelling the mass of cut crop rearwardly therefrom; an upper and lower pair of transversely extending cooperating conditioning rolls disposed generally behind said rotary cutting discs and particularly spaced relative thereto for intercepting the mass of cut crop being propelled rearwardly by said rotary cutting discs, each of said conditioning rolls being rotatively mounted about a horizontal axis within said frame structure and having alternately spaced ribs and grooves circumferentially disposed therearound, the particular spacing of said conditioning rolls for intercepting the rearward propelled crop includes the disposition of said lower rolls such that the lower periphery thereof lies in approximately tangential relationship to the plane of said rotary cutting discs, and the disposition of said upper roll forwardly of said lower roll but in close proximity thereto such that the ribs and grooves of said rolls assume an intermeshed relationship; means for driving said upper and lower conditioning rolls in counter directions for intercepting the rearwardly propelled crop and drawing it between said upper and lower conditioning rolls, discharging the crop about the rear sides of said conditioning rolls; a baffle structure disposed generally behind said conditioning rolls for deflecting the rearward moving crop being discharged from the rear sides of the conditioning rolls onto the ground in a fluffy swath; and a hood extending from behind said conditioning rolls forwardly thereover and having a front portion curved downwardly and terminating spaced apart relationship relative to said cutting disc, tending to enclose said disc and conditioning rolls within said frame structure and hood.

11. A ground traversing crop mowing and conditioning machine, as recited in claim 10, wherein said means for driving said rotary cutting disc includes a drive line disposed transversely beneath said cutting disc and having means extending upwardly therefrom and connected underneath to each disc for driving the individual disc.

* * * * *